US006889548B2

(12) United States Patent
Klees et al.

(10) Patent No.: US 6,889,548 B2
(45) Date of Patent: May 10, 2005

(54) PROBE FOR SENSING A PHYSICAL QUANTITY

(75) Inventors: Daniel Klees, Greenwood, IN (US); Roger Bettenbrock, Greenwood, IN (US); Ola Wesstrom, Greenwood, IN (US)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/299,014

(22) Filed: Nov. 19, 2002

(65) Prior Publication Data

US 2004/0093944 A1 May 20, 2004

(51) Int. Cl.$^7$ ............................................... G01F 23/00
(52) U.S. Cl. .................................................... 73/304 C
(58) Field of Search ........................... 73/304 C, 304 R, 73/290 R, 866.5; 340/620, 618; 277/593, 611, 637

(56) References Cited

U.S. PATENT DOCUMENTS

| | | | | |
|---|---|---|---|---|
| 2,455,982 A | * | 12/1948 | Dowty | ........................ 277/611 |
| 2,783,295 A | * | 2/1957 | Ewing | .................... 174/35 GC |
| 3,812,910 A | * | 5/1974 | Wellstein | .................... 166/85.2 |
| 4,037,654 A | * | 7/1977 | Lien | ............................ 166/85.2 |
| 4,042,020 A | * | 8/1977 | Wellstein | .................... 166/85.2 |
| 4,056,144 A | * | 11/1977 | Wellstein | .................... 166/85.2 |
| 4,507,521 A | * | 3/1985 | Goellner | ...................... 174/151 |
| RE31,974 E | * | 8/1985 | Brownlee | ................. 210/198.2 |

\* cited by examiner

Primary Examiner—Hezron Williams
Assistant Examiner—Katina Wilson
(74) Attorney, Agent, or Firm—Bacon & Thomas

(57) ABSTRACT

A probe is described, that complies to high standards of hygiene, comprising: a process connection, a metal rod comprising a first end of the rod connected to the process connection, a first gasket provided between the process connection and the rod forming a seal between the rod and the process connection, and a cylinder, which is located between the process connection and the rod, which is surrounded by the first gasket, and which defines a minimal distance between the process connection and the rod, the minimal distance ensuring a defined compression force exerted on the first gasket.

10 Claims, 4 Drawing Sheets

PROBE FOR SENSING A PHYSICAL QUANTITY

BACKGROUND OF THE INVENTION

The present invention relates to a probe for sensing a physical quantity.

Probes are commonly used in various branches of industry. They are usually installed in a container and are designed to sense a physical quantity.

Probes are for example employed for level measurements in industrial applications. To determine whether a medium in a container has reached or risen above a predetermined level a probe is inserted into the container such that its tip reaches the predetermined level. The tip is electrically conductive. If the container is electrically conductive a single probe is sufficient for the measurement. A conductivity between the container and the probe can be monitored with the probe. This conductivity changes dramatically when the level reaches the tip of the probe. In case of a non-conductive container a reference probe can be inserted next to the probe and the conductivity between the probe and the reference probe is an indicator for whether the level inside the container has reached the predetermined level.

Alternatively a radio frequency can be applied and a capacitance between the probe and the container or the reference probe can be evaluated.

Frequently more than one predetermined level need to be monitored. Correspondingly more than one probe can be inserted such that for every predetermined level there is a probe inserted having its tip positioned a that predetermined level. In addition to these measurement probes, again a reference probe can be inserted if necessary, as described above.

Frequently probes are also used for continuous level measurement. To this extend a probe extends into the container as far down as a level of a medium inside it shall be measured. There are several methods for continuous level measurement. For example a radio frequency can be applied to the probe and a capacitance between the probe and the container can be evaluated.

Another method consists in sending a short high frequency electromagnetic wave pulse down the probe. The pulse will be reflected at a surface of the level to be measured. Thus a time of flight for the pulse to travel down the probe and its reflection to return can be measured, to obtain a measure for the level inside the container.

Depending on the container and the height of the predetermined level, probes need to be supplied in various length. In industry, for example in the food and beverage industry vessel with heights of up to 30 m are used.

Existing designs use stainless steel rods as probes. Usually a process connection is foreseen, for mounting the probes on site.

In some applications bare metal rods are used and an insulating sleeve, for example out of polytetraflourethylen (PTFA) or perfluoroalkoxy (PFA), is foreseen to electrically insolate the rod against the process connection.

Other probes comprise a tight sheath of plastic, for example polytetraflourethylen (PTFA) or perfluoroalkoxy (PFA), that is molded onto the rod. The rod is cut to length and the plastic is trimmed back on one end to allow the stainless steel tip of the rod to be in electrical contact with the medium in the container.

A potential problem of the existing designs can occur, when the medium enters between the sleeve and the stainless steel rod or between the sheath and the stainless steel rod. This medium will stay there since industrial cleaning methods, in particular hygienic cleaning in place (CIP-Cleaning), are generally unable to reach between the sleeve and the rod or between the sheath and the rod respectively.

Especially in the Pharmaceutical Industry and the Food and Beverage Industry where hygiene standards are very high this can cause severe contamination problems.

SUMMARY OF THE INVENTION

It is an object of the invention to provide a probe for sensing a physical quantity, that complies to high standards of hygiene.

To this end the invention comprises a probe for sensing a physical quantity, comprising:

a process connection, a metal rod comprising a first end of the rod connected to the process connection, a first gasket provided between the process connection and the rod forming a seal between the rod and the process connection, and a cylinder, which is located between the process connection and the rod, which is surrounded by the first gasket, and which defines a minimal distance between the process connection and the rod, the minimal distance ensuring a defined compression force exerted on the first gasket.

According to a preferred embodiment, the probe comprises a metal tip which is connected to a second end of the rod, a sheath covering the rod, a second gasket provided between the rod and the tip which forms a seal between the rod and the sheath by abutting on a front surface of the sheath and an adjacent front surface of the rod facing towards the tip, and the first gasket which forms a seal between the sheath and the rod by abutting on a front surface of the sheath and an adjacent front surface of the rod facing towards the process connection.

According to a preferred embodiment the sheath consists of a plastic with a chemical resistance, in particular of polytetraflourethylen (PTFA) or perfluoroalkoxy (PFA).

According to a preferred embodiment the rod comprises an extension with a smaller diameter than the remainder of the rod, extending through the first gasket and the cylinder into the process connection.

According to a preferred embodiment the tip comprises an extension with a smaller diameter than the remainder of the tip, extending though the second gasket into the rod.

According to a preferred embodiment the rod extension comprises a thread and is screwed into the process connection.

According to a preferred embodiment the tip extension comprises a thread and is screwed into the rod.

According to a preferred embodiment the process connection comprises an extension that extends through the first gasket and is screwed into an axial bore in the rod.

According to a preferred embodiment the rod comprises an extension that extends through the second gasket and is screwed into an axial bore in the tip.

According to a preferred embodiment
a cylinder is foreseen between the tip and the rod, in particular a mid section of the tip or a section of the tip, which is surrounded by the second gasket, and
which defines a minimal distance between the process connection and the tip, the minimal distance ensuring a defined compression force exerted on the second gasket.

Further the invention concerns a measurement device for monitoring one or more predetermined levels comprising a probe according to the invention for every predetermined level to be monitored.

The invention and further advantages are explained in more detail using the figures of the drawing, in which four exemplary embodiments are shown. Same reference numerals refer to the same elements throughout the figures.

DETAILED DESCRIPTION OF THE DRAWINGS

Figure 1:
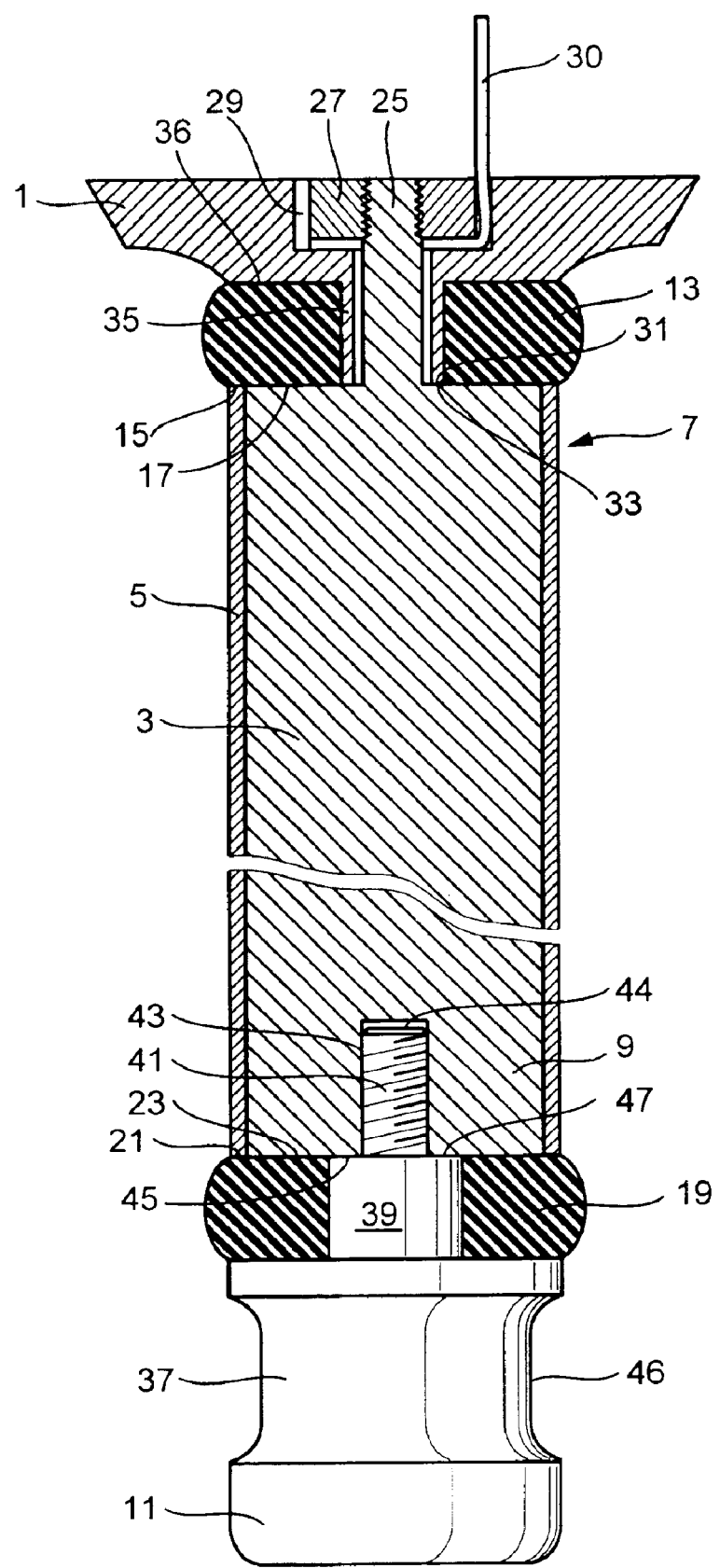
FIG. 1 shows a diagram of a probe according to the invention with a metal rod covered in a sheath.

FIG. 1 shows a schematic diagram of a probe according to the invention. It comprises a process connection 1. The process connection 1 is designed for mounting the probe on a container. The container can have any shape capable of containing a medium inside. The container can for example be a storage or process tank as they are commonly used in the food and beverage industry. Various types of generally standardized forms of process connectors are known in industry. A widely spread type in the food and beverage industry is known under the name tri-clamp. In the embodiment shown in FIG. 1 the process connection 1 is shaped according to the standards for tri-clamp connections. The process connection 1 consists of an insulating material, preferably of perfluoroalkoxy (PFA), polytetraflourethylen (PTFE) or polyetherehterketone (PEEK). This has the advantage, that insulating sleeves as described above with respect to the prior art are not necessary.

The probe comprises a metal rod 3, which is covered by a sheath 5. The sheath 5 is preferably made of an insulating material, preferably of a chemically resistant plastic such as perfluoroalkoxy (PFA), polytetraflourethylen (PTFE) or polyetherehterketone (PEEK). It is for example molded, extruded or bonded onto the rod 3.

A first end 7 of the rod 3 is connected to the process connection 1 and a second end 9 of the rod 3 is connected to a metal tip 11.

A first gasket 13 is provided between the process connection 1 and the rod 3. It forms a seal between the rod 3 and the process connection 1. Simultaneously it forms a seal between the rod 3 and the sheath 5 by abutting on a front surface of the sheath 15 and an adjacent front surface 17 of the rod 3 facing towards the process connection 1.

A hollow cylinder 35 is provided, which is located between the process connection 1 and the rod 3. The cylinder 35 can be part of the process connection 1, as shown in FIG. 1. It is also possible for the cylinder 35 to be part of the rod 3 or even to be an individual part. The cylinder 35 comprises a front surface 31 facing toward the rod 3 abutting on a surface 33 of the rod 3 adjacent to the extension 25 facing toward the process connection 1.

Adjacent a base of the cylinder 35 a flat surface 36 extends radially outward and faces the surface 17 of the rod 3. The first gasket 13 is compressed between the surfaces 17 and 36. The distance between them is equal to the final thickness of the gasket 13 and is equal to a height of the cylinder 35 when the surface 31 abuts on the surface 33, The cylinder 35 is surrounded by the first gasket 13, and defines a minimal distance between the process connection 1 and the rod 3. This minimal distance ensures a defined compression force exerted on the first gasket 13.

A second gasket 19 is provided between the rod 3 and the tip 11. It forms a seal between the rod 3 and the sheath 5 by abutting on a front surface 21 of the sheath 5 and an adjacent front surface 23 of the rod 3 facing towards the tip 11.

The probe comprises an extension 25 with a smaller diameter than the remainder of the rod 3. The extension 25 extends through the cylinder 35 and first gasket 13 into the process connection 1. The extension 25 comprises a thread and is screwed into the process connection 1. A captive nut 27 is located inside an aperture 29 on a side of the process connection 1 facing away from the rod 3 and the extension 25 tightens into the nut 27.

A wire lug 30 is provided under the captive nut 27 which allows electrical connection of the probe to an electronic not shown in FIG. 1. This electronic for example monitors a conductivity or a capacity between the probe and a reference probe or a conductive container and determines whether the medium in the container has reached the predetermined level. The predetermined level corresponds to the height of the tip 11 inside the container.

Inside the cylinder 35 the extension 25 of the rod 3 extends into the aperture 29 and the first gasket 13 fits snugly around the cylinder 35. Thus the first gasket 13 not only prevents medium from entering between the sheath 5 and the rod 3, at the same time it prevents any medium from passing through the process connection 1.

A very similar design is shown in FIG. 1 for connecting the tip 11 to the rod 3. The tip 11 consists of three sections: a cylindrical element 37, a mid section 39 and an extension 41. The cylindrical element 37 has the same outer diameter as the sheath 5. The mid section 39 has an outer diameter which is smaller than the outer diameter of the cylindrical element 37 and the extension 41 has the smallest diameter of all three sections.

Thus the extension 41 has a diameter which is smaller than the remainder of the tip 11. It extends through the second gasket 19 into the rod 3. It comprises a thread 43 and is screwed into a central bore 44 in the rod 3.

A minimal distance between the tip 11 and the rod 3 is defined by a cylinder provided between the tip 11 and the rod 3. It ensures a defined compression force exerted on the second gasket 19. In the embodiment shown in FIG. 1 the cylinder is formed by the mid section 39 of the tip 11. It is surrounded by the second gasket 19.

In order to ensure the minimal distance the tip 11 is screwed onto the rod 3 until a surface 45 of the mid section 39 facing toward the rod 3 abutts on a surface 47 of the rod 3 facing toward the tip 11 near an opening of the central bore 44.

On the tip 11 wrench flats 46 are provided to allow tightening or loosening of the tip 11.

Figure 2:
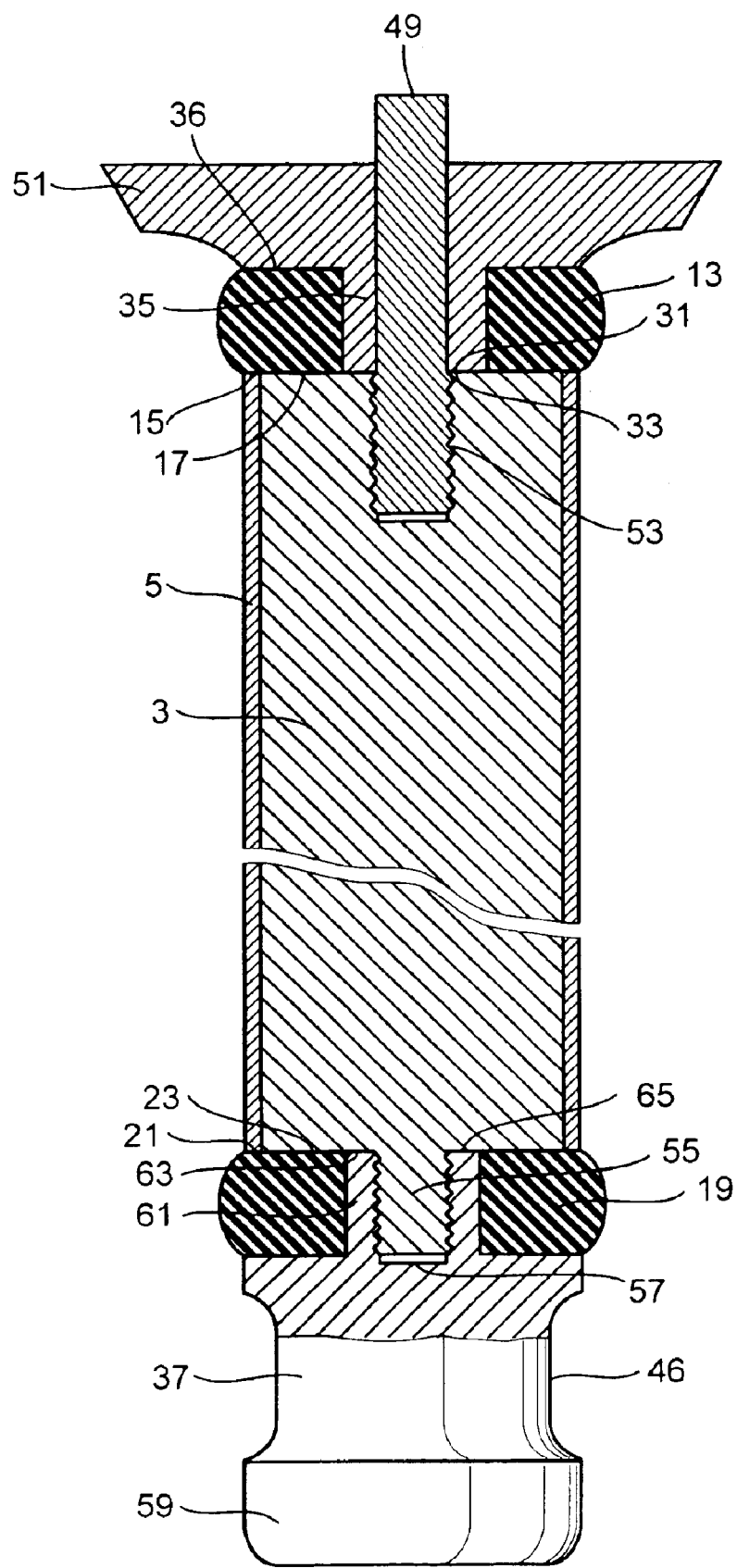
FIG. 2 shows a diagram of a probe according to the invention.

FIG. 2 shows a diagram of another embodiment of a probe according to the invention. Because the embodiments are very similar only the differences are described.

Whereas in the embodiment shown in FIG. 1 the rod 3 comprises an extension 25 extending into the process connection 1, in the embodiment shown in FIG. 2, an extension 49 forms an integrated part of a process connection 51. The extension 49 is formed by a thin metal cylinder with a male thread along its entire length. It extends through the process connection 51 and through the first gasket 13 into a central axial bore 53 in the rod 3.

An electrical connector for electrically connecting the probe to an electronic, not shown in FIG. 2, can be screwed directly onto a part of the extension 49 extending through the process connection 51 on a side facing away from the rod 3.

The extension 49 is held inside the process connection 51. This can for example be achieved by molding the process connection 51 onto the extension 49. The axial bore 53 of the rod 3 is provided with a female thread and the rod 3 is screwed onto the extension 49.

Again a minimal distance ensuring a defined compression force exerted on the first gasket 13 between the process connection 1 and the rod 3 is defined by the cylinder 35 provided between the process connection 51 and the rod 3. Adjacent the base of the cylinder 35 a flat surface 36 extends radially outward and faces the surface 17 of the rod 3. The first gasket 13 is compressed between the surfaces 17 and 36. The distance between them is equal to the final thickness of the gasket 13 and is equal to a height of the cylinder 35 when the surface 31 abuts on the surface 33.

Whereas as described above one end of the rod 3 near the process connection 51 comprises an axial bore 53, another end of the rod 3 comprises an extension 55, which extends through the second gasket 19 and is screwed into an axial bore 57 of a tip 59. The tip 59 is very similar to the one shown in FIG. 1 in that it comprises the cylindrical element 37 and an adjacent section 61 facing towards the rod 3 with a smaller outer diameter. The axial bore extends into the section 61.

Again a cylinder is provided between the tip 59 and the rod 3. In the embodiment shown in FIG. 2 the cylinder is formed by the section 61 of the tip 59. It is surrounded by the second gasket 19 and defines a minimal distance between the rod 3 and the tip 59.

When the tip 59 is mounted on the probe, a front surface 63 of the cylinder, formed by section 61, abuts on a front surface 65 of the rod 3 facing toward the tip 59, thus ensuring a defined compression force exerted on the second gasket 19.

In the embodiments shown in FIG. 1 and FIG. 2, the first and the second gasket 13, 19 form a seal, such that no medium can enter between the sheath 5 and the rod 3. The first and the second gasket 13, 19 can be easily exchanged if the application requires regular changing of any organic materials inserted in the container. The gaskets 13, 19 are easily removable for inspection and/or replacement as may be required by sanitary standards. This is for example frequently the case in the food and beverage industry.

In most applications, any parts of the probe that can possibly contact the medium can be made of fairly cheap materials, such a stainless steel. Therefore, for most applications it is sufficient, for the tips 11, 59 and the rod 3 to consist of stainless steel. In case special materials with a higher chemical standability are needed, for example titanium or hastelloy, probes according to the invention have the advantage, that the rod 3 itself can still be made of stainless steel, since the rod 3 is protected by the first and the second gasket 13, 19 and the sheath 5, such that it is never in contact with the medium. Thus only the tip 11, 59 needs to consist of the special material.

Figure 3:
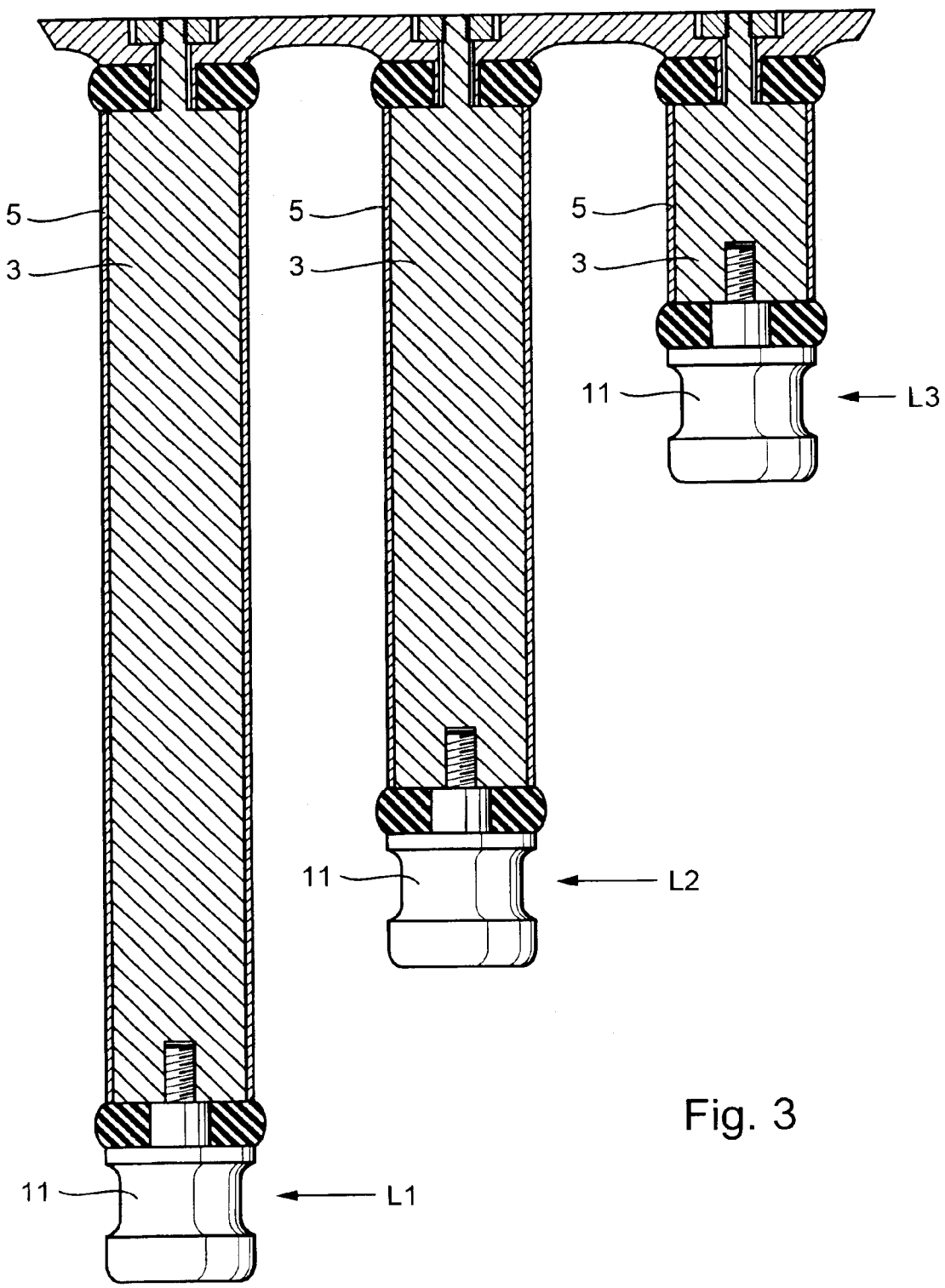
FIG. 3 shows a diagram of a device comprising three probes.

FIG. 3 shows a measurement device for monitoring one or more predetermined levels of a medium in a container. It comprises a probe according to the invention for every predetermined level to be monitored.

In the embodiment shown in FIG. 3 the device comprises three probes identical to the ones shown in FIG. 1. with different length. With this device three different levels L1, L2, L3 can be monitored, each of the levels corresponding to the height of one of the tips 11 of the probes. Alternatively, the longest probe can be operated as a reference probe and the remaining to probes can then be used to monitor the predetermined levels L2 and L3.

Figure 4:
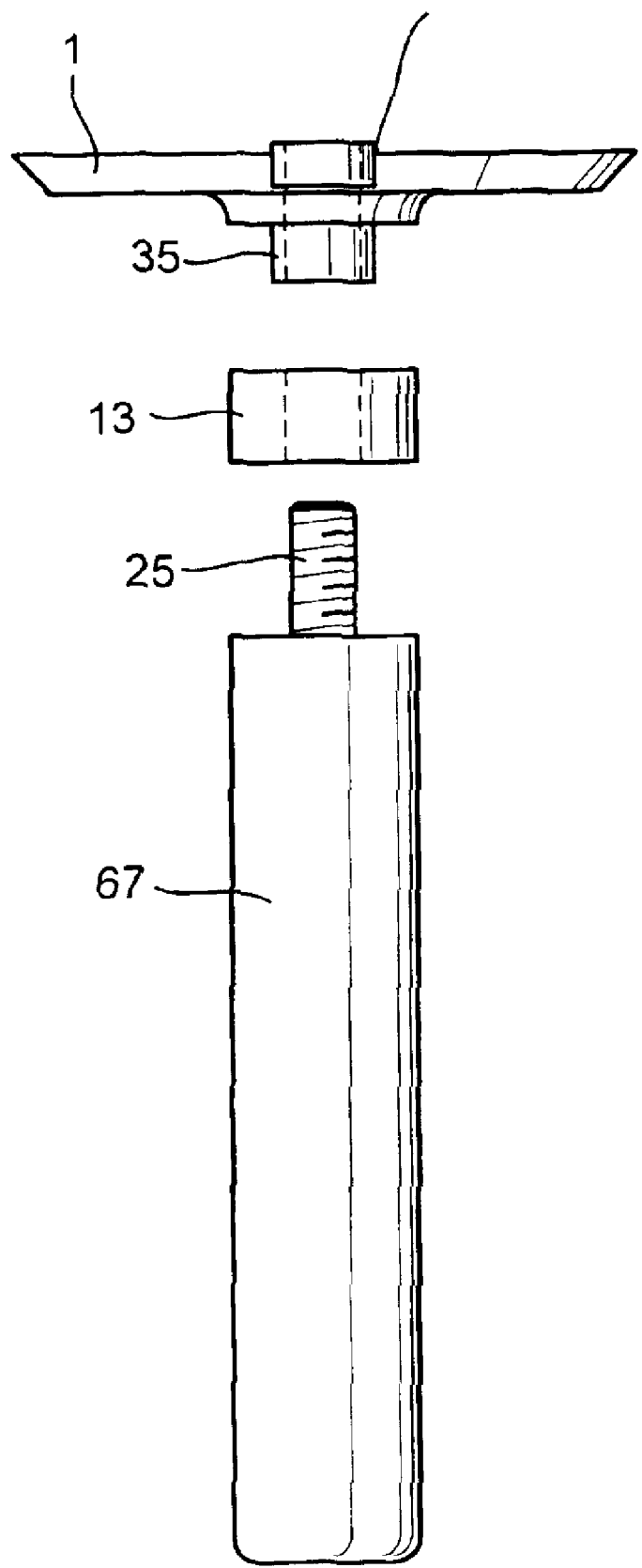
FIG. 4 shows a diagram of a probe according to the invention comprising a bare metal rod.

FIG. 4 shows an exploded view another embodiment of a probe according to the invention. It is very similar to the probe shown in FIG. 1. The only differences are, that the rod 3 is not covered by a sheath and that it does not comprise a tip. It comprises a process connection 1 identical to the one shown in FIG. 1 and a metal rod 67. A first end of the rod 67 is connected to the process connection 1. As in the embodiment shown in FIG. 1, the first gasket 13 is provided between the process connection 1 and the rod 67 and forms a seal between the rod 67 and the process connection 1. The cylinder 35 is located between the process connection 1 and the rod 3 and is surrounded by the first gasket 13. This defines a minimal distance between the process connection 1 and the rod 3. The minimal distance ensuring a defined compression force exerted on the first gasket 13.

Non-sheathed, tip-less probes as in the embodiment shown in FIG. 4 can also be used in devices where several probes are installed in proximity to each other, as for example the device shown in FIG. 3.

An advantage of probes according to the invention is, that the rods 3 can be cut to the desired length on site. The required extensions, threads and bores can be easily machined on site since this does not require any high precision works.

Another advantage of probes according to the invention is, that the process connections 1, 51 are made of insulators. This makes it possible to contact the rod 3 through the process connection 1, 51 via a passageway inside the cylinder 35 which is surrounded by the first gasket 13. No further feedthrough, insulation parts and corresponding sealing means are necessary.

What is claimed is:

1. A probe for sensing a physical quantity, comprising:

a process connection;

a metal rod having a first end connected to said process connection;

a first gasket provided between said process connection and said metal rod forming a seal between said metal rod and said process connection; and a cylinder, located between said process connection and said metal rod, wherein:

said cylinder is surrounded by said first gasket; and said first gasket defines a minimal distance between said process connection and said metal rod, the minimal distance ensuring a defined compression force exerted on said first gasket.

2. The probe according to claim 1, further comprising:

a metal tip connected to a second end of said metal rod;

a sheath covering said metal rod; and a second gasket provided between said metal rod and said metal tip which forms a seal between said metal rod and said sheath by abutting on a front surface of said sheath and an adjacent front surface of said metal rod facing towards said metal tip, wherein:

said first gasket forms a seal between said sheath and said metal rod by abutting on a front surface of said sheath and an adjacent front surface of said metal rod facing towards said process connection.

3. The probe according to claim 2, wherein:

said sheath consists of a plastic with a chemical resistance, in particular of polytetraflourethylen (PTFA) or perfluoroalkoxy (PFA).

4. The probe according to claim 2, wherein:

said metal tip comprises an extension with a smaller diameter than the remainder of said metal tip, extending through said second gasket into said metal rod.

5. The probe according to claim 4, wherein:

said metal tip extension comprises a thread and is screwed into said metal rod.

6. The probe according to claim 2, wherein:

said metal rod comprises an extension that extends through said second gasket and is screwed into an axial bore in said metal tip.

7. The probe according to claim 2, wherein:

a cylinder located between said metal tip and said metal rod, in particular a mid section of said metal tip or a section of said metal tip, said cylinder being surrounded by said second gasket, and wherein:

said second gasket defines a minimal distance between said process connection and said metal tip; and the minimum distance insuring a defined compression force exerted on said second gasket.

8. The probe according to claim 1, wherein:

said metal rod comprises an extension with a smaller diameter than the remainder of said metal rod, extending through said first gasket and said cylinder into said process connection.

9. The probe according to claim 8, wherein:

said metal rod extension comprises a thread and is screwed into said process connection.

10. A measurement device for monitoring one or more predetermined levels (L1, L2, L3) comprising a probe for every predetermined level (L1, L2, L3) to be monitored, each probe comprising:

a process connection;

a metal rod having a first end connected to said process connection;

a first gasket provided between said process connection and said metal rod forming a seal between said metal rod and said process connection; and a cylinder, located between said process connection and said metal rod, wherein:

said cylinder is surrounded by said first gasket; and said first gasket defines a minimal distance between said process connection and said metal rod, the minimal distance ensuring a defined compression force exerted on said first gasket.

* * * * *